April 18, 1967 J. V. CULL 3,315,210

THIRTEEN TRAFFIC CONNECTOR

Filed June 26, 1964

John V. Cull

INVENTOR.

BY Clarence A. O'Brien and Harvey B. Jacobson, Attorneys 3,315,210
THIRTEEN TRAFFIC CONNECTOR
John V. Cull, P.O. Box 7342, Dallas, Tex. 75209
Filed June 26, 1964, Ser. No. 378,210
8 Claims. (Cl. 339—32)

The present invention generally relates to an electrical connector especially adapted for use in conjunction with electrical circuits such as those employed for connecting the terminals on a conventional terminating network frame such as used in central switching stations of telephone offices.

One of the more important functions of electronic and communication assemblies, particularly in telephone equipment, is switching which is either done by operators or by automatic switching devices. In the telephone industry, one of the primary problems is the bringing of the communication line into a specific switching apparatus in a central switching station. In most telephone switching stations, it is conventional practice to connect the incoming lines to terminal blocks. The cabling from the switching equipment is also connected to the terminals of those blocks so that the blocks function to connect the switching equipment to the incoming communication line. It is also conventional practice to route the incoming lines to various types of switching equipment by means of direct cabling which is terminated on the terminal blocks. The terminals are individually connected to various types of switching equipment.

A specific terminal on these terminal blocks is cabled directly to a switching network frame known in the Bell Telephone System as the "Automatic Number Identification Frame." This network is made up of a series of network terminals and bus bar terminals which are connected to a capacitor-resistor network of the automatic number identification equipment. These terminals protrude through a card which has a group of holes in a hexagon shape and these groups of holes are located adjacent each other in an evenly spaced orthogonal pattern. It is conventional practice to electrically connect the terminals together by using wire-wrap connections. However, these wire-wraps have proven to be unsatisfactory because it is necessary that the location of these wire-wraps be frequently changed for connecting different terminals. It is a tedious and time consuming process to place or remove the conventional wire-wrap, and reconnect them to different terminals of the terminal network frame.

Accordingly, it is the primary object of the present invention to provide an improved and highly efficient connector for electrically connecting the terminals of the terminal network frame conventionally used in telephone switching stations with the improved connector replacing the conventional wire-wrap and routing the proper signals to the proper switching or recording equipment.

Another object of the present invention is to provide an improved terminal connector which may be quickly and readily installed or removed by a technician or craftsman without requiring any special tools or any particular skill on the part of the person installing or removing the connector.

Still another object of the invention is to provide a terminal connector which includes a plurality of circuits and which comprises a minimum number of parts and is of relatively simple design but yet effective for particular purposes thereby providing a connector that is relatively inexpensive to manufacture.

A further object of the present invention is to provide an electrical connector or a thirteen traffic connector incorporating spring type contacts that are freely floatable within cavities formed in a housing of dielectric material with the spring contacts being arranged so that by rotating the connector 180 degrees and putting it back on the array of terminals, different connections may be made.

A further object of the present invention is to provide identification means for the connector which may be in the form of numerals in which the code numeral in proper position indicating the particular connection being made by the connector.

Still another very important object of the present invention is to provide a connector which is sub-miniature in that its over-all height is such that additional circuit connections can be made with the connectors in place inasmuch as the spring contact permits the terminals to protrude through them and the terminals protrude completely through the connector with the connector being approximately or slightly less than one-half the length of the connectors thus enabling additional connectors to be used or enabling other connections to be made in relation to the terminals with the connectors in place.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
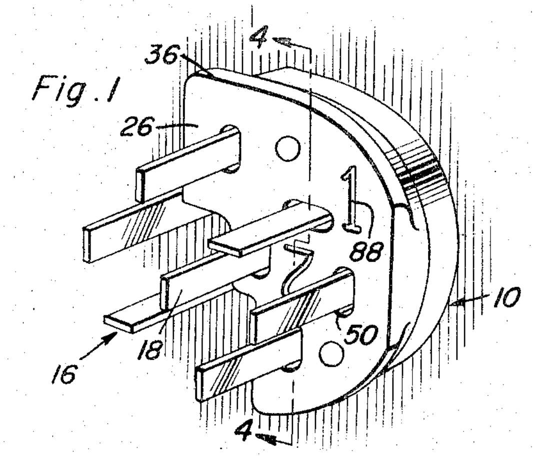
FIGURE 1 is a perspective view of the connector of the present invention installed in one position thereof.

Referring now specifically to the drawings, the thirteen traffic connector of the present invention is generally designated by the numeral 10 and it is illustrated in relation to a card 12 having a plurality of apertures 14 therein arranged in a hexagon pattern with an array of terminals 16 extending therethrough. The card 12 and the terminal array 16 is conventional. The terminal array includes a central terminal 18, two vertical terminals 20 and two vertical terminals 22 for tip and ring, and two horizontal tip bus and ring bus terminals 24 which are horizontal.

The terminal connector 10 includes a housing or body 26 of dielectric material of which the housing is constructed of two component parts or segments 28 and 30. The housing segment 28 includes a pair of projecting pins 32 which are received in apertures 34 in the housing segment 30 and the segments 28 and 30 may be constructed of plastic material so that the pins may be deformed after assembly of the housing segments 28 and 30. One peripheral edge of the housing section 30 includes a radius lip 36 forming means for gripping the connector 10 for placing it on and removing it from the terminal array 16.

The housing segment 28 is provided with a plurality of cavities 38 for receiving spring contact assemblies 40 and 42 and the housing segment 30 is also provided with cavities 44 for also receiving the spring assemblies 40 and 42 or 43.

The cavities 38 of the housing segment 28 has an aperture 46 in the bottom thereof with the aperture 46 communicating with an outwardly flared entrance throat 48 therefor for guiding terminals into the aperture 46. Also, the inner end of the cavities 44 is provided with an aperture 50 for enabling the terminals to project outwardly beyond the terminal connector 10.

The spring contact assembly 40 is generally angulated in configuration and includes a central portion 52 with each end having a projecting portion 56 thereon. One of the projecting portions 56 is in the form of a horizontally disposed inwardly opening U-shaped member 58 while the other projection 56 is an upwardly extending and inwardly opening U-shaped member 60 thereon as illustrated particularly in FIGURE 6.

The U-shaped member 58 is provided with a pair of legs 62 and 64 which are parallel with each other and the U-shaped member 60 is provided with a pair of spaced parallel legs 66 and 68. The legs 64 and 68 have terminal ends which are free so that the legs may flex in relation to each other.

Figure 6:
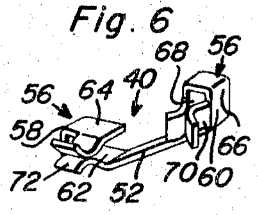
FIGURE 6 is a perspective view of one of the spring contact elements incorporated into the connector.

Projecting forwardly from the edge of each leg 62–68 is an angulated contact member 70 which is generally V-shaped in configuration and provided with outwardly flared entrance surfaces 72 and the apices of the V-shaped configuration of the members 70 are in spring biased contacting relationship with the opposite surfaces of the terminals of the terminal array 16. Corresponding pairs of contacts 70 are provided on the edges of legs 62 and 64 and the legs 66 and 68 as illustrated in FIGURE 6.

Figure 7:
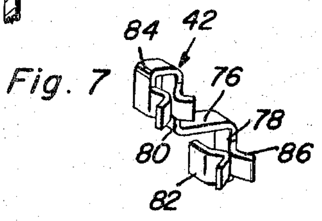
FIGURE 7 is a perspective view of another of the spring contact members.

FIGURE 7 illustrates the spring contact assembly designated by numeral 42 and used in conjunction with the assembly 40. The contact assembly 42 includes a central plate-like portion 76 which includes a downward extension 78 and an upward extension 80. The downward extension 78 terminates in an upwardly opening U-shaped member 82 having a pair of spaced parallel legs and the upwardly extending member 80 terminates in a downwardly opening U-shaped member 84 having a pair of parallel legs. On each of the legs of the U-shaped members 82 and 84, there is provided a laterally extending contact 86 which is of substantially the same construction and configuration as the contacts 70 described in connection with FIGURE 6.

Figure 4:
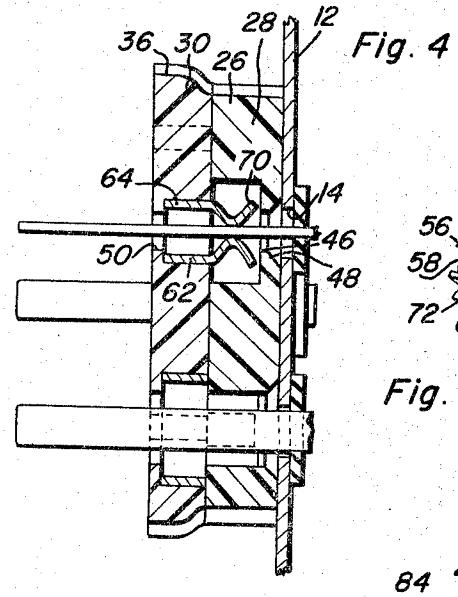
FIGURE 4 is a vertical sectional view taken substantially upon a plane passing along section line 4—4 of FIGURE 1 illustrating structural details of the connector.

When the contact assemblies 40 and 42 are inserted into the cavities 44 in the housing segment 30 and the housing 28 placed thereover so that the contacts are received in the cavities 38 in the housing segment 28 as illustrated in FIGURE 4, the connector is then assembled and ready for use with the terminal array 16.

Figure 3:
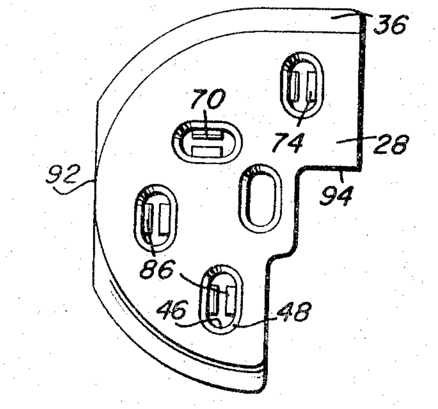
FIGURE 3 is an elevational view of the inner surface of the terminal connector.

FIGURE 3 illustrates the tapered or inclined construction of the entrance 48 which forms a throat for the aperture 46 for guiding the terminals into the guide space defined by the inclined entrance surfaces 72 on the contacts 70 thereby serving to align the connector with the terminals and to align any misaligned free floating terminals for facilitating placement of and removal of the connector on the terminal array.

The housing segment 30 is provided with a numeral 1 formed thereon as designated by reference numeral 88 and a numeral 2 as designated by reference numeral 90 with the numerals 1 and 2 being oppositely formed so that in one position of the connector, the numeral 1 will be properly orientated while the numeral 2 is inverted as illustrated in FIGURE 1. Then, if the connector is rotated 180 degrees to make a different connection, the numeral 2 will then be properly orientated while the numeral 1 will be inverted thereby providing a code for indicating the type of connection being made by the connector 10.

Figure 8:
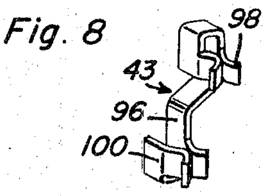
FIGURE 8 is a perspective view of another type of spring contact member used in a connector to form a multiparty connector.
Figure 5:
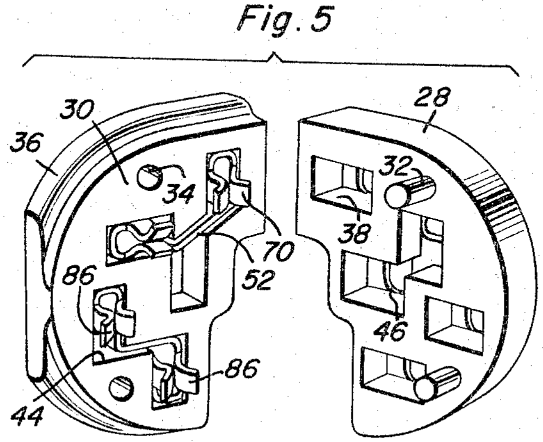
FIGURE 5 is an exploded group perspective view illustrating the two parts of the dielectric body or housing separated prior to assembly.

A third contact assembly 43 is illustrated in FIGURE 8 and will be incorporated into a connector that engages the central terminal 18 and the upper terminal 20. The letter M would appear on the connector orientated such that the letter M will be upright when the connector is put on the array of terminals to denote the multi-party connection. Such a connector would be of a different color to distinguish one party, two party and multi-party connectors or assemblies.

The third spring assembly 43 includes a central angulated portion 96 having inwardly opening U-shaped clips 98 and 100 integral therewith at each end for engaging upper terminal 20 and central terminal 18. The clips 98 and 100 are similar in structure and operation to the clips illustrated in FIGURES 6 and 7.

The spring contact assembly provides maximum tension on the broad face of the terminal which it contacts. The spring assemblies have a floating action within the cavity of the housing which permits insertion of misaligned terminals therein. The spring assemblies are constructed of heat treated beryllium, copper, Phosphor bronze or any suitable spring material, and provides a permanent and positive gripping action on the terminal for producing an effective connector. The dielectric housing is provided with a flat side 92 and a notched or cutaway side 94 to retain the dimensions thereof as small as possible so that other connectors may be employed on adjacent terminal arrays without interference with each other.

By employing the present invention, it will be readily apparent that the thirteen traffic connector provides a simple, reliable and inexpensive method of electrically connecting closely spaced terminals for circuit configuration which are repeatedly used. The electrical contact provided by the connector of the present invention meets and sometimes exceeds the wire-wrap method heretofore used. Further, the connector is sub-miniature to allow additional connections to be made to the same terminals and the connector is easily installed and removed thereby enabling it to be used on original equipment or with existing equipment. The circuits formed by the connector may be identified by color coding, number coding or the like for quick positive identification.

Figure 2:
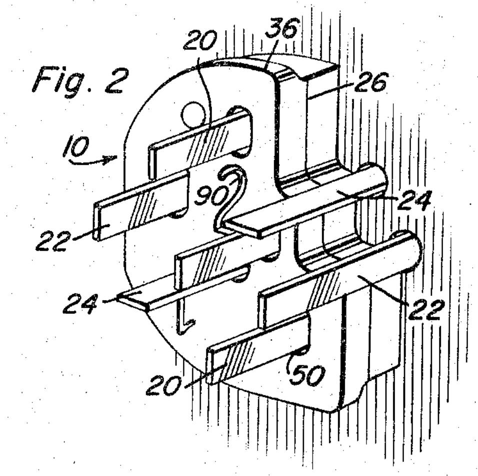
FIGURE 2 is a perspective view similar to FIGURE 1 but with the terminal connector inverted or rotated 180 degrees.

One specific application of the connector of the present invention is in the Automatic Number Identification equipment used by the Bell Telephone System and FIGURE 1 illustrates the connector plugged onto the terminals in such a position as to form a particular circuit combination. In FIGURE 2, the connector has been rotated 180 degrees about the center terminal for making a different circuit connection. The numerical characters and possibly color coding may be employed to indicate the circuit formed by the connector in its position by being able to observe a numeral character in its upright condition. In actual practice, the connector may be used to form a circuit configuration known as a ring-party field connection or single-party connection, a tip-party field connection or two-party connection or a multi-party connection.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A terminal connector comprising a dielectric body having a plurality of at least four openings extending therethrough, arranged in different angular positions with respect to each other and adapted to be received on an array of flat faced terminals, spring contact assemblies received in said housing for limited free movement and for contacting engagement with the terminals for connecting certain of each of said terminals together, said spring contact assemblies including two clips having legs terminating in outwardly flared end portions for guiding the terminals therethrough, said legs having curved central portions for line contact with the flat faced terminals, said openings and the spring contact assemblies are orientated in patterns for association with an array of terminals in different angular positions for forming different connections between terminals depending upon the positioning of the spring contact assemblies and housing in relation to the terminals.

2. The structure as defined in claim 1 together with indicia means on said housing for indicating the position thereof for indicating the connections being made by the connector when in a particular orientation.

3. The structure as defined in claim 2 wherein said housing is provided with a central opening adapted to receive a central terminal of the array of terminals.

4. The structure as defined in claim 2 wherein each spring contact assembly consists of a strip having a constant width and thickness throughout its length and being constructed of conductive material having at least a pair of conductive clips unitary therewith and opening laterally thereof for engaging a pair of terminals, each of said clips having a pair of of gripping legs having outwardly flared end portions for guiding terminals therebetween, each gripping leg having a convex gripping surface forming a line contact with a flat terminal.

5. The combination of claim 4 wherein said strip is angulated with all the clip legs disposed in parallel planes.

6. The combination of claim 4 wherein said strip is angulated with legs of one clip being perpendicular to the legs of the other clip.

7. A terminal connector comprising a dielectric body provided with at least a pair of openings therethrough for receiving a pair of flat surfaced terminals, at least one spring contact assembly received in said body for connecting the pair of terminals, said assembly including a conductive strip with a pair of clips aligned with the openings in the body and including aligned open ends to enable the terminals to project completely through the body for enabling more than one connector to be assembled on the pair of terminals, each clip including a pair of gripping legs opening laterally of the strip, said legs having spaced end portions to enable passage of the terminals, the central portion of the legs being convex and closely disposed for line contact with the flat surfaced terminals.

8. A terminal connector comprising a two-piece body of dielectric material, said body having a plurality of at least four openings extending therethrough, arranged in different angular positions with respect to each other and with each opening being generally oval-shaped in configuration for receiving an array of flat faced terminals therethrough, the two pieces of said body being joined together in face-to-face relation with the engaging faces including grooves therein communicating with the openings and forming interior hollow recesses when the two pieces of the body are joined, said grooves having a greater cross-sectional area than the openings thus providing inwardly facing retaining shoulders, at least one outer end of an opening being defined by a beveled edge forming a guide for flat surfaced terminals being inserted therethrough, and a spring contact assembly disposed in an internal recess and including a strip of conductive material having a constant width substantially equal to the depth of the groove in one of the body pieces, a laterally extending and laterally opening clip at each end of said strip with the clip having a dimension generally approximating the depth of the internal recess defined by the grooves in the two pieces of the body, each clip including a pair of legs spaced from each other with the ends of the legs disposed adjacent the beveled opening in the body being outwardly flared for receiving a flat surfaced terminal therethrough and each clip having aligned open ends to enable the terminals to project completely through the body, the portions of the legs adjacent the outwardly flared ends being inwardly curved towards each other for engaging the opposed surfaces of the flat surfaced terminal substantially with line contact, said legs being retained between the shoulders and being spaced from one of said shoulders a small distance to enable limited free movement of the spring contact assemblies for enabling shifting thereof to adapt them to the terminals.

References Cited by the Examiner

UNITED STATES PATENTS

| | | | |
|---|---|---|---|
| 1,664,090 | 3/1928 | Sargent | 339—154 |
| 2,032,980 | 3/1936 | Fitzgerald | 339—31 |
| 2,264,040 | 11/1941 | Johnson et al. | 339—33 |
| 2,922,054 | 1/1960 | Miller. | |
| 3,016,512 | 1/1962 | Borchard | 339—217 |
| 3,139,492 | 6/1964 | Cage. | |

FOREIGN PATENTS

| | | |
|---|---|---|
| 1,268,825 | 6/1961 | France. |

BOBBY R. GAY, *Primary Examiner.*

J. H. McGLYNN, *Assistant Examiner.*